(12) United States Patent
Chang

(10) Patent No.: US 6,271,824 B1
(45) Date of Patent: Aug. 7, 2001

(54) SCROLL METHOD OF A COMPUTER SYSTEM

(75) Inventor: Chen-Ming Chang, Taipei Hsien (TW)

(73) Assignee: Primax Electronics Ltd., Taipei Hsien (TW)

(*) Notice: Subject to any disclaimer, the term of this patent is extended or adjusted under 35 U.S.C. 154(b) by 0 days.

(21) Appl. No.: 09/373,783

(22) Filed: Aug. 13, 1999

(30) Foreign Application Priority Data

Jul. 8, 1999 (TW) .................................................. 88111566

(51) Int. Cl.⁷ ...................................................... G09G 5/34
(52) U.S. Cl. ............................................. 345/123; 345/341
(58) Field of Search .................................... 345/123, 124, 345/125, 115, 146, 341

(56) References Cited

U.S. PATENT DOCUMENTS 5,862,381 * 1/1999 Advani et al. ....................... 345/123

* cited by examiner

Primary Examiner—Matthew Luu
(74) Attorney, Agent, or Firm—Winston Hsu

(57) ABSTRACT

The present invention provides an image scrolling system for scrolling an image frame contained in a window which is displayed in a monitor of the system. The image scrolling system comprises a scrolling signal generator for generating scrolling signals to perform scrolling of the image frame. Each of the scrolling signals is first converted into a corresponding two-dimensional vector which is then converted to a displacement vector. The displacement vector is added with a current coordinate of the image frame displayed within the window to obtain a next coordinate, and the image frame is scrolled to the next coordinate.

9 Claims, 4 Drawing Sheets

SCROLL METHOD OF A COMPUTER SYSTEM

BACKGROUND OF THE INVENTION

1. Field of the Invention

The present invention relates to a computer system, and more particularly, to a scroll method of a computer system.

2. Description of the Prior Art

Window-based operating systems are commonly used in computer systems for editing and browsing documents. In a window-based operating system, a document is displayed in an image frame which is contained in a window, and the window is displayed in a monitor of a computer system. However, the image frame often cannot display the document in full because the display area of the image frame has a limited size. In order to view a hidden portion of the document below the image frame, a user has to move the cursor to a down arrow of a vertical scroll bar, and click on one of the buttons of a mouse. Once the button is clicked, the document will move upward line-by-line. Vice versa, if the button is clicked when the cursor is positioned on an up arrow of the vertical scroll bar, the document will move downward line-by-line.

In computer programming, the command for scrolling is SendMessage(hWnd, WH_VSCROLL, SB_LINEUP, NULL). The parameter which causes the line movement is SB_LINEUP. The line movement is very disturbing for the user, thus research has been focusing on more comforting means to scroll the document.

SUMMARY OF THE INVENTION

It is therefore a primary objective of the present invention to provide a scroll method of a computer system to solve the above mentioned problem.

In a preferred embodiment, the present invention provides an image scrolling system for scrolling an image frame contained in a window which is displayed in a monitor of the system, the system comprising:

a memory for storing programs and data;

a processor for executing the programs stored in the memory;

an input device electrically connected to the processor having a scrolling signal generator for generating scrolling signals to control the scrolling of the image frame in the window;

an operating system stored in the memory for controlling operations of the image scrolling system, the operating system comprising a display control program for controlling the display of the window in the monitor;

an application program stored in the memory and executed under the operating system for controlling the scrolling of the image frame within the window by using the display control program;

an input device driver stored in the memory and executed under the operating system for receiving and processing the scrolling signals from the input device and transmitting the processed scrolling signals to the application program to control the scrolling of the image frame within the window;

wherein the input device driver converts each of the scrolling signals into a corresponding displacement vector, adds the displacement vector with a current coordinate of the image frame displayed within the window to obtain a next coordinate, and transmits the next coordinate to the application program so as to scroll the image frame to the next coordinate.

It is an advantage of the present invention that the scrolling of the image frame can be performed smoothly so that the scrolling will no longer cause visual discomforts.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
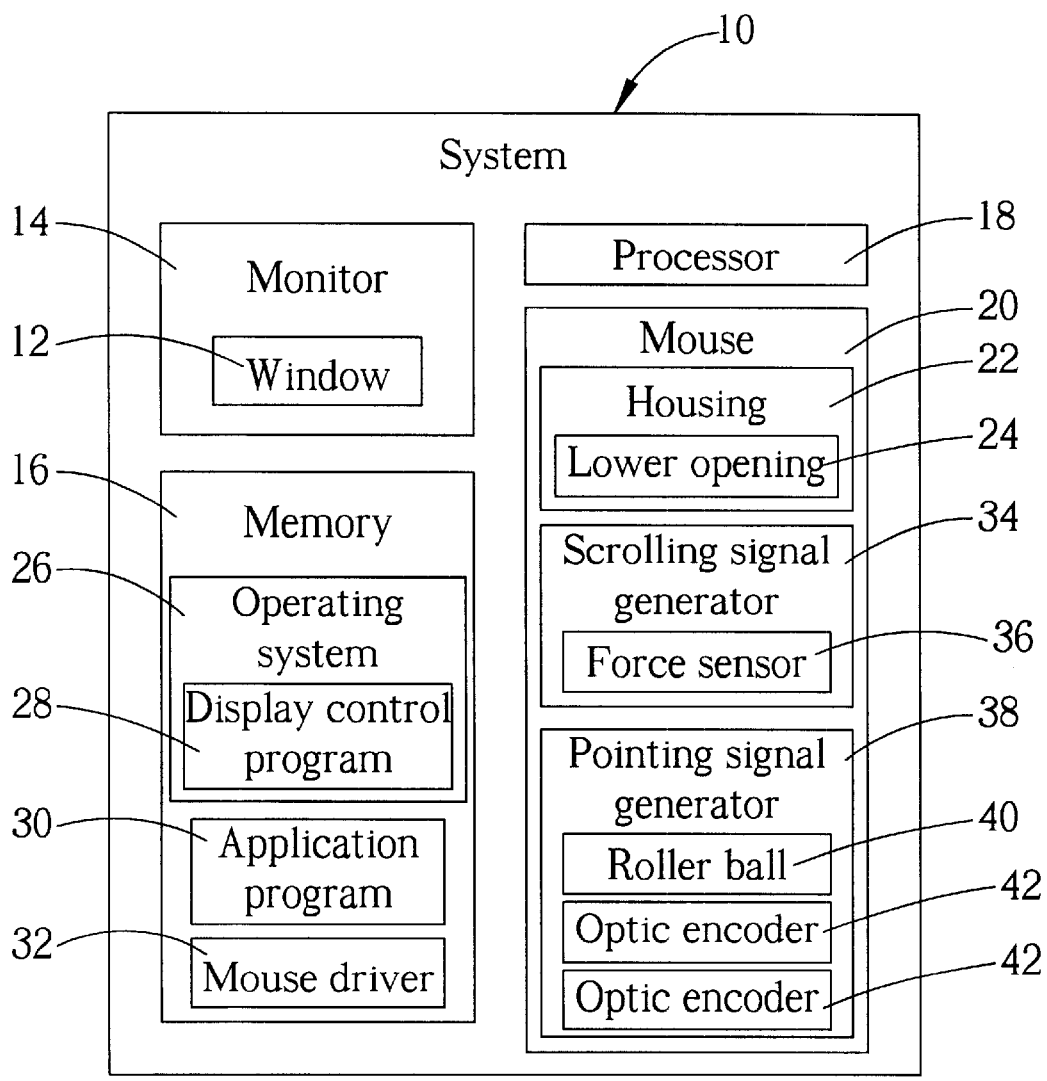
FIG. 1 is a functional block diagram of an image scrolling system according to the present invention.
Figure 2:
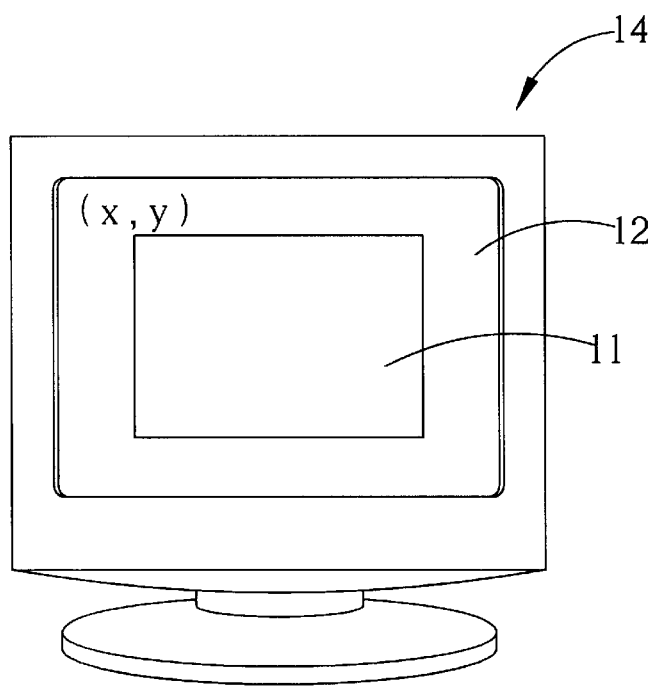
FIG. 2 is a perspective view of the monitor in FIG. 1.

Please refer to FIGS. 1 and 2. FIG. 1 is a functional block diagram of an image scrolling system 10 according to the present invention. FIG. 2 is a perspective view of the monitor 14 in FIG. 1. The present invention relates to an image scrolling system 10 for scrolling an image frame 11 contained in a window 12. The window 12 is displayed in the monitor 14 of the system 10. The image frame 11 can display only a portion of a document. The portion of the document displayed in the image frame 11 has a position relative to the full document. The position can be represented by a coordinate (x,y) wherein x and y separately represent the position of the image frame relative to the full document in horizontal and vertical directions.

The image scrolling system 10 comprises a memory 16 for storing programs and data, a processor 18 for executing the programs stored in the memory 16, a mouse 20 electrically connected to the processor 18, and an operating system 26 such as Microsoft Windows 98 stored in the memory 16 for controlling operations of the image scrolling system 10. The operating system 26 comprises a display control system 28 for controlling the display of the window 12 in the monitor 14. The image scrolling system 10 further comprises an application program 30 such as Netscape Navigator stored in the memory 16 and executed under the operating system 26 for controlling the scrolling of the image frame 11 within the window 12 by using the display control program 28, and a mouse driver 32 stored in the memory 16 and executed under the operating system 26.

The mouse 20 has a scrolling signal generator 34 for generating scrolling signals to control the scrolling of the image frame 11 in the window 12. The scrolling signals can be either one-dimensional or two-dimensional. A one-dimensional scrolling signal can be used to control scrolling of the image frame 11 along the horizontal or vertical direction within the window 12. A two-dimensional scrolling signal can be used to concurrently control both horizontal and vertical scrolling of the image frame 11 in the window 12. The mouse driver 32 is used for receiving and processing the scrolling signals from the mouse 20 and transmitting the processed scrolling signals to the application program 30 to control the scrolling of the image frame 11 within the window 12.

Figure 3:
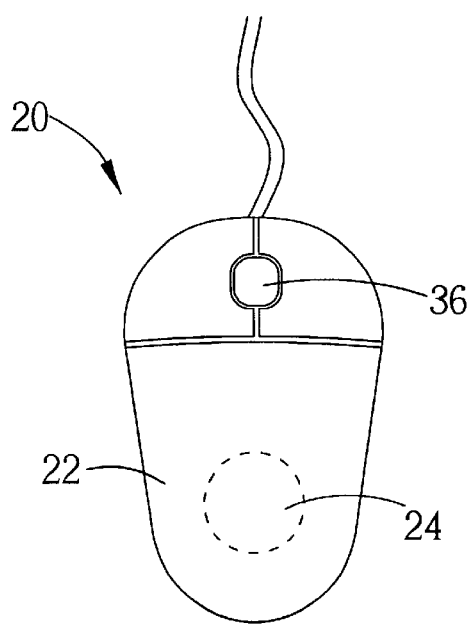
FIG. 3 is a perspective view of the mouse in FIG. 1.

Please refer to FIG. 3. FIG. 3 is a perspective view of the mouse 20. The mouse 20 comprises a housing 22. The housing 22 has a lower opening 24 at its lower end. The scrolling signal generator 34 comprises a force sensor 36 installed at an upper end of the housing 22 of the mouse 20. The force sensor 36 can be depressed by using a finger toward various directions and generate corresponding two-dimensional scrolling signals to control two-dimensional scrolling of the image frame 11 in the window 12.

Figure 4:
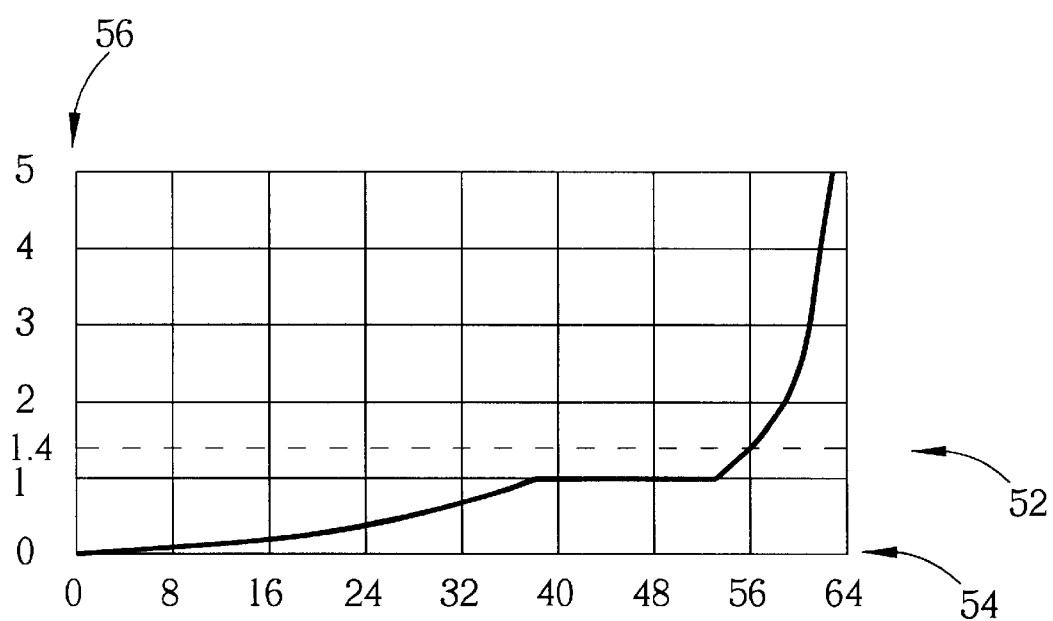
FIG. 4 is a force conversion table.

Please refer to FIG. 4. FIG. 4 shows a force conversion table 52. The force conversion table 52 is associated with one of the two dimensions of the scrolling signals. Each dimension of the scrolling signals has a corresponding force conversion table 52. The force conversion table 52 is used for converting the force experienced by the force sensor 36 into a corresponding scrolling signal. The horizontal axis 54 of the force conversion table 52 represents instruction codes generated when the force sensor 36 is depressed. The greater the force is applied on the force sensor 36, the higher the instruction code is. Each of the instruction codes corresponds to a multiplier as shown in the vertical axis 56 of the force conversion table 52. For example, when the force applied on the force sensor 36 causes the generation of an instruction code such as 40, the image frame 11 will scroll at a normal speed because the multiplier is 1. When the force applied on the force sensor 36 causes the generation of an instruction code such as 56, the image frame 11 will scroll at a 1.4 times of the normal speed because the multiplier is 1.4. From the table 52, the greater the applied force is, the faster the image frame 11 scrolls.

The mouse driver 32 converts each of the two-dimensional scrolling signals into a corresponding two-dimensional vector according to force conversion tables 52 associated with each dimension of the scrolling signals, and converts the two-dimensional vector into a corresponding displacement vector ($\Delta x, \Delta y$) according to a predetermined formula. The mouse driver 32 then adds the displacement vector ($\Delta x, \Delta y$) with a current coordinate (x,y) of the image frame 11 displayed within the window 12 to obtain a next coordinate (x+$\Delta x$,y+$\Delta y$), and transmits the next coordinate (x+$\Delta x$,y+$\Delta y$) to the application program 30 so as to scroll the image frame 11 to the next coordinate (x+$\Delta x$, y+$\Delta y$).

Figure 5:
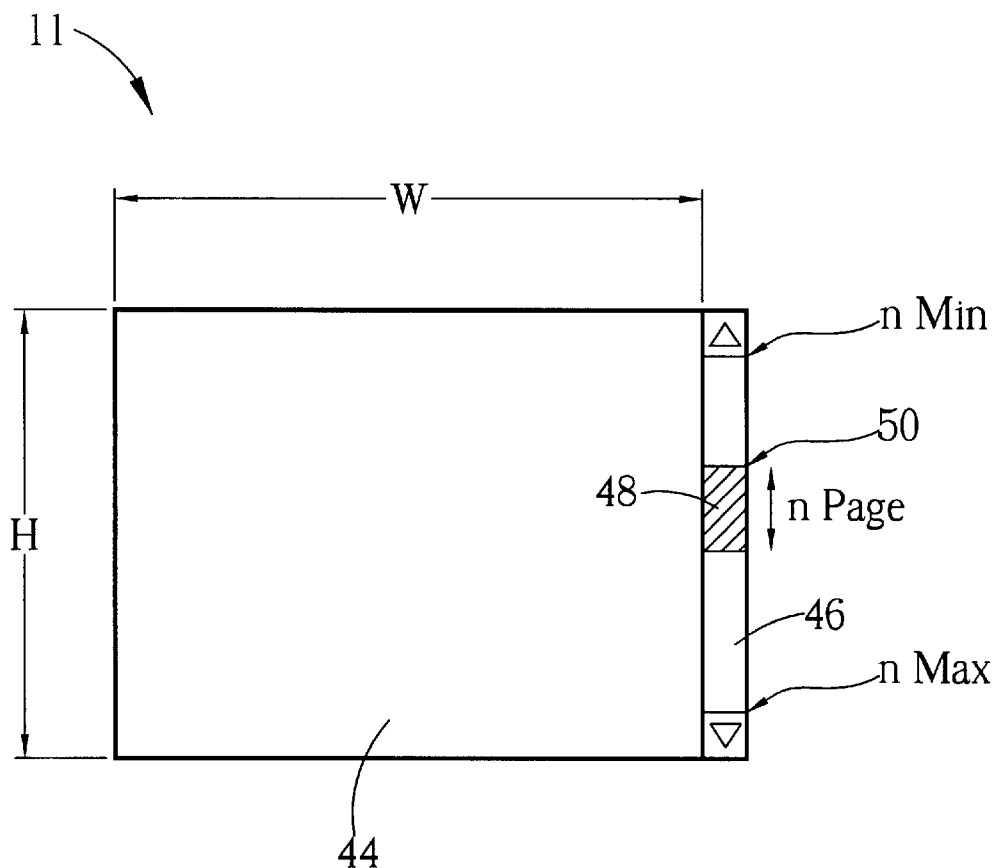
FIG. 5 is the image frame of the window in FIG. 2.

Please refer to FIG. 5. FIG. 5 is the image frame 11 of the window 12. The image frame 11 comprises a display area 44 and a vertical scroll bar 46. The vertical scroll bar 46 comprises a scroll square 48 vertically moveable in the scroll bar 46. The scrolling of the image frame 11 is executed according to the following instructions:

1. GetWindowRect
    which reads width (W) and height (H) data of the display area 44 of the image frame 11;
2. GetScrollInfo
    which reads length data (npage) and an upper edge position 50 of the scroll square 48, and an upper boundary position (nMin) and a lower boundary position (nmax) of the scroll bar 46;
3. $\Delta P'=(F*nPage/H)*K+\Delta d$
    wherein $\Delta P'$ is the current displacement step, F is the force imposed on the force sensor 36, nPage/H is the length ratio of the scroll square 48 to the scroll bar 46, which equals the length ratio of the display area 44 to the whole document, K is a constant, and
    $\Delta d$ is a remaining decimal portion of the last displacement step $\Delta P$;
4. nPos'=nPos+$\Delta P'$
    wherein nPos' is the upper edge position 50 of the scroll square 48 when the image frame 11 is moved to the next coordinate, and
    nPos is the upper edge position 50 of the scroll square 48 when the image frame 11 is in the current coordinate;
5. if(nPos'<0) nPos'=0;
    if (nPos'>(nmax-nPage)) nPos'=nMax-nPage which defines a boundary condition for the scroll square 48;
6. SendMessage(hWnd, WH_VSCROLL, MAKELONG (SB.THUMBTRACK, nPos'), NULL)
    wherein the instruction "MAKELONG" directly defines the upper edge position 50 of the scroll square 48 therefore the image frame 11 can be scrolled smoothly;
7. SetScrollPos(hWnd, SB_VERT, nPos', FALSE)
    which is used to update the upper edge position 50 of the scroll square 48.

Because each of the scrolling signals is converted into a displacement vector, and the displacement vector is added with the current coordinate of the image frame 11 to generate the next coordinate, the image scrolling system 10 can scroll the image frame 11 in the window 12 pixel-by-pixel. When scrolling the image frame 11, a user only has to depress his finger on the force sensor 36 of the mouse 20, then the image frame 11 will be scrolled according to the direction of the finger depression. Thus the prior art scroll bar is no longer needed for performing scrolling.

The mouse 20 further comprises a pointing signal generator 38 installed at a lower end of the housing 22 for detecting movements of the housing 22 and generating corresponding two-dimensional pointing signals. The pointing signal generator 38 comprises a roller ball 40 rotatably mounted inside the lower opening 24, and two optic encoders 42 installed in the housing 22 and engaged with the roller ball 40 for detecting movements of the roller ball 40 along two orthogonal directions and generating the two-dimensional pointing signals so as to control movements of a cursor on the monitor 14. The display of the cursor is controlled by the display control program 28. When the mouse driver 32 receives the pointing signals transmitted from the mouse 20, the mouse driver 32 processes the pointing signals and transmits the processed pointing signals to the display control program 28 for controlling displacements of the cursor on the monitor 14.

Compared with the prior art scrolling method, the image scrolling system 10 uses the scrolling signals generated by the scrolling signal generator 34 of the mouse 20 to perform scrolling of the image frame 11. Each of the scrolling signals is first converted into a corresponding two-dimensional vector which is then converted to a displacement vector. The displacement vector is added with a current coordinate of the image frame 11 displayed within the window 12 to obtain a next coordinate, and the image frame 11 is scrolled to the next coordinate. Because the image frame 11 is scrolled pixel-by-pixel, not line-by-line, the scrolling is performed smoothly and is very comforting.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image scrolling system for scrolling an image frame contained in a window which is displayed in a monitor of the system, the system comprising:

a memory for storing programs and data;

a processor for executing the programs stored in the memory;

an input device electrically connected to the processor having a scrolling signal generator for generating scrolling signals to control the scrolling of the image frame in the window;

an operating system stored in the memory for controlling operations of the image scrolling system, the operating system comprising a display control program for controlling the display of the window in the monitor;

an application program stored in the memory and executed under the operating system for controlling the scrolling of the image frame within the window by using the display control program;

an input device driver stored in the memory and executed under the operating system for receiving and processing the scrolling signals from the input device and transmitting the processed scrolling signals to the application program to control the scrolling of the image frame within the window;

wherein the input device driver converts each of the scrolling signals into a corresponding displacement vector, adds the displacement vector with a current coordinate of the image frame displayed within the window to obtain a next coordinate, and transmits the next coordinate to the application program so as to scroll the image frame to the next coordinate.

2. The image scrolling system of claim 1 wherein the input device further comprises a pointing signal generator for generating two-dimensional pointing signals to control two-dimensional movements of a cursor displayed in the monitor, the display of the cursor is controlled by the display control program, the input device driver further receives and processes the pointing signals from the input device and transmits the processed pointing signals to the display control program to control movements of the cursor in the monitor.

3. The image scrolling system of claim 2 wherein the input device is a mouse which comprises a housing and wherein the pointing signal generator is installed at a lower end of the housing for detecting movements of the housing and generating corresponding two-dimensional pointing signals, and the scrolling signal generator is installed at an upper end of the housing which can be actuated by using a finger to generate the scrolling signals.

4. The image scrolling system of claim 3 wherein the housing of the mouse comprises a lower opening at its lower end and wherein the pointing signal generator comprises:

a roller ball rotatably mounted inside the lower opening; and two optic encoders installed in the housing and engaged with the roller ball for detecting movements of the roller ball along two orthogonal directions and generating the two-dimensional pointing signals.

5. The image scrolling system of claim 3 wherein the scrolling signal generator comprises a force sensor installed at an upper end of the housing of the mouse which can be depressed by using a finger toward various directions and generate corresponding two-dimensional scrolling signals to control two-dimensional scrolling of the image frame in the window.

6. The image scrolling system of claim 5 wherein each of the two-dimensional scrolling signals received by the input device driver is first converted into a correspondent two-dimensional vector according to a predetermined force conversion table, and then the two-dimensional vector is converted into the displacement vector according to a predetermined formula.

7. The image scrolling system of claim 1 wherein the scrolling signal can be a one-dimensional signal for controlling scrolling of the image frame along a horizontal or a vertical direction in the window, or a two-dimensional signal for controlling the scrolling of the image frame along horizontal and vertical directions in the window.

8. An image scrolling system for scrolling an image frame contained in a window which is displayed in a monitor of the system, the system comprising:

a memory for storing programs and data;

a processor for executing the programs stored in the memory;

a mouse electrically connected to the processor, the mouse comprising a housing and a force sensor installed at an upper end of the housing of the mouse which can be depressed by using a finger toward various directions and generate corresponding two-dimensional scrolling signals to control two-dimensional scrolling of the image frame in the window;

an operating system stored in the memory for controlling operations of the image scrolling system, the operating system comprising a display control program for controlling the display of the window in the monitor;

an application program stored in the memory and executed under the operating system for controlling the scrolling of the image frame within the window by using the display control program;

a mouse driver stored in the memory and executed under the operating system for receiving and processing the scrolling signals from the mouse and transmitting the processed scrolling signals to the application program to control the scrolling of the image frame within the window;

wherein the mouse driver converts each of the scrolling signals into a corresponding displacement vector, adds the displacement vector with a current coordinate of the image frame displayed within the window to obtain a next coordinate, and transmits the next coordinate to the application program so as to scroll the image frame to the next coordinate.

9. An image scrolling system for scrolling an image frame contained in a window which is displayed in a monitor of the system, the system comprising:

a memory for storing programs and data;

a processor for executing the programs stored in the memory;

a mouse electrically connected to the processor, the mouse comprising a housing and a force sensor installed at an upper end of the housing of the mouse which can be depressed by using a finger toward various directions and generate corresponding one-dimensional or two-dimensional scrolling signals to control one-dimensional or two-dimensional scrolling of the image frame in the window;

an operating system stored in the memory for controlling operations of the image scrolling system, the operating system comprising a display control program for controlling the display of the window in the monitor;

an application program stored in the memory and executed under the operating system for controlling the scrolling of the image frame within the window by using the display control program;

a mouse driver stored in the memory and executed under the operating system for receiving and processing the one-dimensional or two-dimensional scrolling signals from the mouse and transmitting the processed one-dimensional or two-dimensional scrolling signals to the application program to control the scrolling of the image frame within the window;

wherein the mouse driver converts each of the one-dimensional or two-dimensional scrolling signals into a corresponding one-dimensional or two-dimensional vector according to a predetermined force conversion table, converts the one-dimensional or two-dimensional vector into a corresponding displacement vector according to a predetermined formula, adds the displacement vector with a current coordinate of the image frame displayed within the window to obtain a next coordinate, and transmits the next coordinate to the application program so as to scroll the image frame to the next coordinate.

* * * * *